(12) United States Patent
Hsu et al.

(10) Patent No.: US 7,030,860 B1
(45) Date of Patent: Apr. 18, 2006

(54) FLEXIBLE TRANSPARENT TOUCH SENSING SYSTEM FOR ELECTRONIC DEVICES

(75) Inventors: Andrew C. Hsu, Belmont, CA (US); Shawn P. Day, San Jose, CA (US); Richard Schediwy, Union City, CA (US); David Gillespie, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 09/415,481

(22) Filed: Oct. 8, 1999

(51) Int. Cl.
  *G09G 5/08* (2006.01)
(52) U.S. Cl. .................... 345/173; 345/179; 178/18.06
(58) Field of Classification Search ................ 345/173, 345/172, 156, 179, 174, 18.05, 18.06, 176; 178/18.01, 18.09, 19.01, 20.01, 18.04, 18.05, 178/18.06; 341/33, 34; 200/211; 463/37; 173/18.01
See application file for complete search history.

(56) References Cited

U.S. PATENT DOCUMENTS

| | | | |
|---|---|---|---|
| 3,757,322 A | | 9/1973 | Barkan et al. .......... 340/365 C |
| 4,484,038 A | | 11/1984 | Dorman et al. ............ 200/5 A |
| 4,686,332 A | | 8/1987 | Greanias et al. .............. 178/19 |
| 4,733,222 A | | 3/1988 | Evans .................... 340/365 C |
| 4,806,709 A | | 2/1989 | Evans .......................... 178/19 |
| 4,931,782 A | * | 6/1990 | Jackson ....................... 345/174 |
| 4,945,348 A | | 7/1990 | Ibamoto et al. ............. 340/784 |
| 4,954,823 A | | 9/1990 | Binstead ....................... 341/26 |
| 5,021,640 A | * | 6/1991 | Muroi ......................... 235/462 |
| 5,122,787 A | * | 6/1992 | Fujita et al. ................... 345/97 |
| 5,149,919 A | * | 9/1992 | Greanias et al. .............. 178/19 |
| 5,305,017 A | | 4/1994 | Gerpheide ................... 345/174 |
| 5,381,160 A | | 1/1995 | Landmeier | 
| 5,386,219 A | * | 1/1995 | Greanias et al. ............. 345/174 |
| 5,457,289 A | | 10/1995 | Huang et al. .................. 178/20 |
| 5,543,588 A | | 8/1996 | Bisset et al. | 
| 5,559,504 A | | 9/1996 | Itsumi et al. | 
| 5,844,506 A | | 12/1998 | Binstead ....................... 341/34 |
| 5,880,411 A | | 3/1999 | Gillespie et al. | 
| 5,909,211 A | * | 6/1999 | Combs et al. ............... 345/172 |
| 5,942,733 A | | 8/1999 | Allen et al. ..................... 179/1 |
| 5,952,998 A | * | 9/1999 | Clancy et al. ............... 345/173 |
| 6,016,140 A | * | 1/2000 | Blouin et al. ................ 345/178 |
| 6,137,427 A | | 10/2000 | Binstead ....................... 341/33 |

(Continued)

FOREIGN PATENT DOCUMENTS

EP            0 185 671 B1     12/1991

(Continued)

*Primary Examiner*—Amr A. Awad
*Assistant Examiner*—Abbas Abdulselam
(74) *Attorney, Agent, or Firm*—Ingrassia Fisher & Lorenz PC

(57) ABSTRACT

A transparent, capacitive sensing system particularly well suited for input to electronic devices is described. The sensing system can be used to emulate physical buttons or slider switches that are either displayed on an active display device or printed on an underlying surface. The capacitive sensor can further be used as an input device for a graphical user interface, especially if overlaid on top of an active display device like an LCD screen to sense finger position (X/Y position) and contact area (Z) over the display. In addition, the sensor can be made with flexible material for touch sensing on a three-dimensional surface. Because the sensor is substantially transparent, the underlying surface can be viewed through the sensor. This allows the underlying area to be used for alternative applications that may not necessarily be related to the sensing system. Examples include advertising, an additional user interface display, or apparatus such as a camera or a biometric security device.

30 Claims, 5 Drawing Sheets

U.S. PATENT DOCUMENTS

| | | | |
|---|---|---|---|
| 6,163,313 A * | 12/2000 | Aroyan et al. | 345/173 |
| 6,222,528 B1 * | 4/2001 | Gerpheide et al. | 345/173 |
| 6,262,717 B1 * | 7/2001 | Donohue et al. | 345/156 |
| 6,297,811 B1 * | 10/2001 | Kent et al. | 345/173 |
| 6,411,344 B1 * | 6/2002 | Fujii et al. | 349/12 |
| 6,414,671 B1 * | 7/2002 | Gillespie et al. | 345/157 |
| 6,504,530 B1 * | 1/2003 | Wilson et al. | 345/173 |
| 6,686,546 B1 * | 2/2004 | Chiu | 178/18.01 |
| 6,704,068 B1 * | 3/2004 | Murade | 349/44 |

FOREIGN PATENT DOCUMENTS

| | | |
|---|---|---|
| EP | 0 754 370 B1 | 10/2002 |
| GB | 2 161 935 A | 1/1986 |
| GB | 2 223 986 A | 4/1990 |
| WO | WO 85/04994 A1 | 11/1985 |
| WO | WO 88/05577 A1 | 7/1988 |
| WO | WO 95/27334 A1 | 10/1995 |

\* cited by examiner

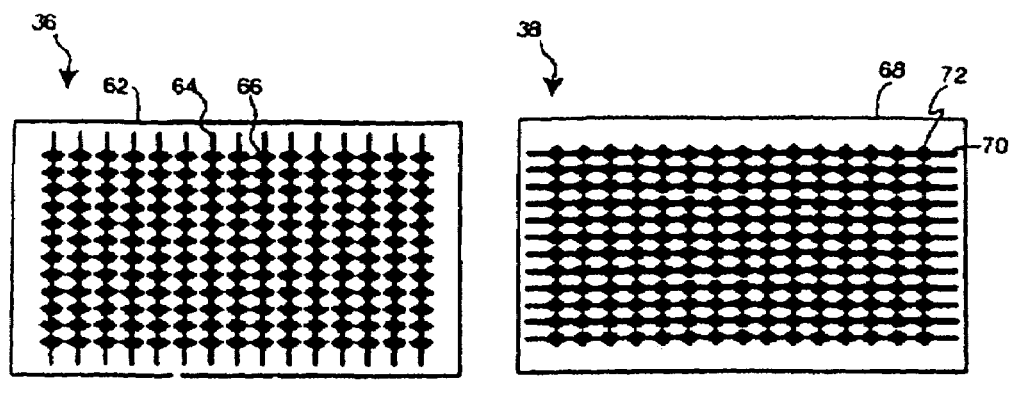
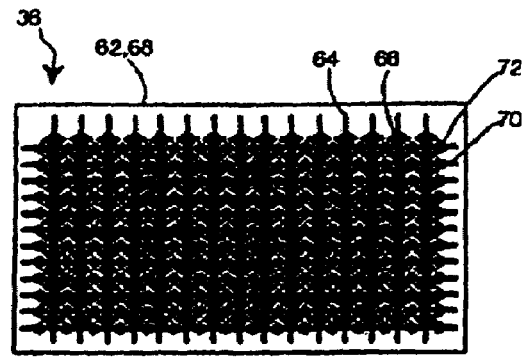

FLEXIBLE TRANSPARENT TOUCH SENSING SYSTEM FOR ELECTRONIC DEVICES

BACKGROUND OF THE INVENTION

1. Field of the Invention

The present invention relates to touch sensing transducers and systems. More particularly, the present invention relates to flexible and transparent object position recognition devices useful in applications such as cursor movement and user input for computing devices and other applications.

2. Description of the Related Field

Touch sensing technology can be used to provide a variety of input to electronic devices, from emulating physical buttons or slider switches to more sophisticated recognition of patterns or gestures. For example, U.S. Pat. No. 5,880,411 to Gillespie, which is hereby incorporated in its entirety for its teaching of touch sensor technology, discloses a capacitive sensor trace array object position detector with edge motion feature and gesture recognition. U.S. Pat. No. 5,305,017 to Gerpheide teaches an object position detector using capacitive sensing and is also incorporated in its entirety by reference for its teaching of touch sensor technology. Another example of capacitive touchpads is U.S. Pat. No. 5,543,588 to Bisset.

However, in many applications it is desirable to display the surface underlying the touchpad. For example, the touchpad can be overlaid on an active display such as a LCD or CRT screen to facilitate input to a graphical user interface (GUI). Alternatively, it may be desired to have the underlying surface display static information such as a button pattern to guide user input or advertising. Neither Gillespie nor Bisset disclose or suggest the ability to display a surface underlying the touchpad sensor.

The general strategy employed by the prior art to provide transparent touch sensing technology for portable devices utilizes a resistive pad. A typical resistive pad consists of two substantially transparent substrates separated by a thin air gap, typically about 0.006 inches. One substrate is deformable, such as a polyester film, while the other is typically rigid, such as glass or polycarbonate plastic. Both substrates are coated with a substantially transparent, conductive coating like Indium Tin Oxide on the surface where they face one another. On the ITO-coated surfaces, one substrate contains conductors at its left and right edges while the other substrate contains conductors at its top and bottom. To measure position in one axis, a voltage gradient is applied to one set of conductors while voltage is measured on the other set. When an object deforms the resistive pad so that one substrate contacts the other, the point of contact will contain a voltage proportional to the distance from the conductor where the voltage was applied. To measure position in the other axis, the conductors for voltage application and measurement are switched.

There are other variations of the previously described 4 wire resistive pad sensors. One example is a 5-wire design which alternately applies an X-axis, than Y-axis voltage gradient to the one layer and then uses the second layer simply to sense voltage.

Different prior art techniques deal with the difficulty of maintaining a constant air gap between the two ITO layers and the stretching of the deformable substrate as it wears. For example, substantially transparent dielectric spacer dots, usually about 0.010" in diameter, can be arranged in a regular, grid-like fashion over one of the ITO surfaces. These dots help maintain the air gap to prevent the two ITO layers from accidentally contacting. Further, the dots help counteract the decreasing performance of the deformable substrate as it wears and stretches. However, the use of these spacer dots generally reduces the resolution of the touchpad, as not all locations of such a resistive pad will necessarily generate a signal when the two substrates come in contact.

In addition to the resistive pad technologies, other examples of prior art include capacitance based technologies, stylus based technologies and pressure actuation technologies. Prior art capacitive touchpads such as U.S. Pat. No. 5,457,289 to Huang and U.S. Pat. Nos. 4,806,709 and 4,733,222 to Evans suffer from various drawbacks of their own. For example, Huang requires frontal shielding for its capacitive touch sensor system and the Evans '709 requires a uniformly electrically conductive surface. Stylus based pads such as U.S. Pat. No. 5,381,160 to Landmeir and U.S. Pat. No. 4,945,348 to Ibamoto require an electromagnetic tool to provide input. Finally, pressure actuated touchpads such as U.S. Pat. No. 4,484,038 to Dorman and U.S. Pat. No. 3,757,322 to Barkan have moving parts and thus suffer from drawbacks similar to the resistive pad technologies.

SUMMARY OF THE INVENTION

The invention is a capacitive sensor system comprising a sensor trace and a processor configured to detect capacitance changes in the sensor trace to determine proximity of a conductive object. Preferably, the sensor trace is a part of a first plurality of sensor traces oriented in a first direction and the processor detects capacitance changes in the sensor traces to determine proximity and positioning of the finger in the first dimension. More preferably, the system further comprises a second plurality of sensor traces oriented in a second dimension, wherein the processor is further configured to detect capacitance changes in the first plurality of sensor traces and the second plurality of sensor traces to determine proximity and positioning of the conductive object along the first and second dimensions. The preferred conductive object for this invention is a human finger, but a conductive stylus or other suitable device can be used as well.

To maximize transparency, the sensor system should have a uniform density of sensor traces. Thus, preferred configurations minimize the overlap of the first plurality and the second plurality of sensor traces. For example, each sensor trace may be configured as a series of diamond shapes aligned along a common axis. Accordingly, each plurality of sensor traces thus creates a pattern of diamond shaped open spaces. By positioning the first plurality of sensor traces over the second plurality so that the diamond shaped sensor traces fall over the diamond shaped open spaces, the amount of overlap between the each plurality of sensor traces is minimized. Transparency is also maximized by utilizing materials having similar indices of refraction.

A primary object of this invention is a positioning system that uses a low-cost, highly integrated, low power, capacitive transparent sensor. This invention is suitable for many handheld electronic applications such as, but not limited to, cell phones, pagers, personal digital assistants, remote controls, and computers. Non-handheld devices that require a positioning system with a thin transparent sensor are also appropriate for this invention. Preferably, the sensor system is equipped with a processor capable of recognizing gestures such as tapping or dragging to increase the flexibility of user input.

The current invention described offers a number of advantages over resistive pads and the other prior art technologies.

First, this art is rugged. Its performance will not degrade over time and is not subject to mechanical wear and stress, being completely solid state and having no moving parts. Because this art does not rely on deforming a substrate, the sensor can be activated with no actuation force. Second, the resolution of sensing is determined by the density of sensor traces and the precision of the A/D converters in the processor, not the physical properties of the materials as in resistive pads. Thus, very high positioning accuracy can be achieved. Because the current invention does not require an air gap to be maintained between the sensing layers, positioning performance is hardly affected by mechanical damage or environmental conditions such as temperature, humidity or power supply voltage. Consequently, the positioning capabilities of this art require little to no user calibration. Furthermore, the lack of an air gap, with an index of refraction much different than the substrate layers, allows this art to achieve greater transparency. Finally, the ability to use flexible substrate material to build the sensor facilitates the integration of this art onto devices that require a touch-sensing system on a curved, three-dimensional surface. Alternatively, the sensor array itself can be directly applied to a rigid, curved three-dimensional surface without the requirement of a flexible substrate.

BRIEF DESCRIPTION OF THE DRAWINGS

FIG. 5A is a top view of the X sensor array in the embodiment shown in FIG. 4.

FIG. 5B is a top view of the Y sensor array in the embodiment shown in FIG. 4.

FIG. 5C is a top view of the combined X and Y sensor arrays in the embodiment shown in FIG. 4.

DETAILED DESCRIPTION OF THE INVENTION

Figure 1:
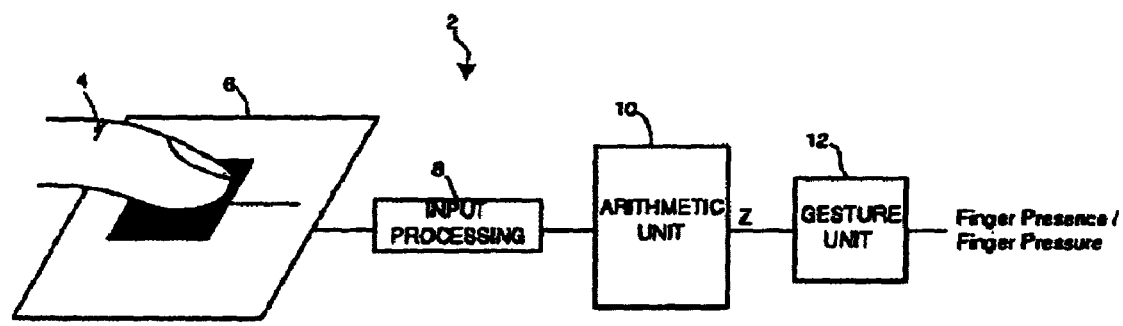
FIG. 1 shows a schematic representation of a proximity transparent capacitive sensing system of the present invention.

FIG. 1 is a schematic representation of a preferred embodiment of the invention, comprising a O-dimensional, capacitive proximity sensing system 2. System 2 accurately determines the proximity and contact of finger 4 or any other conductive object to the sensor 6. Capacitance changes induced by finger 4 on the sensor trace in the sensor 6 are digitized by the input processing block 8. The digitized values of capacitance values are processed by arithmetic unit 10 and then decoded by gesture unit 12 to determine if a finger was present. Gesture unit 12 also processes input signals to determine the difference between constant finger contact and a finger tap. Blocks 8–12 may also incorporate methods to suppress electrical noise that may be sensed by sensor 6. Suitable means of implementing this sensor include the technologies described in U.S. Pat. Nos. 5,880, 411 and 5,305,017, which were incorporated in their entirety by reference thereto above for these teachings. Other means of capacitive sensing technology known to those of skill in the art are also suitable.

The sensor trace in sensor 6 must be designed so that the trace provides adequate capacitive coupling to the finger. In the preferred embodiment, the sensor trace is a thin line of conductor that is drawn to the location where the finger is designed to contact. At this preferred contact area, the trace widens to a square or a circle approximately the dimensions of a typical fingerprint. This ensures that adequate capacitive coupling will occur between the sensor and the finger. Non-visible portions of the sensor can optionally be drawn with an opaque conductor with better handling properties and lower resistance. Examples of an opaque conductor include, but are not limited to, silver ink and conductive carbon ink.

Figure 2:
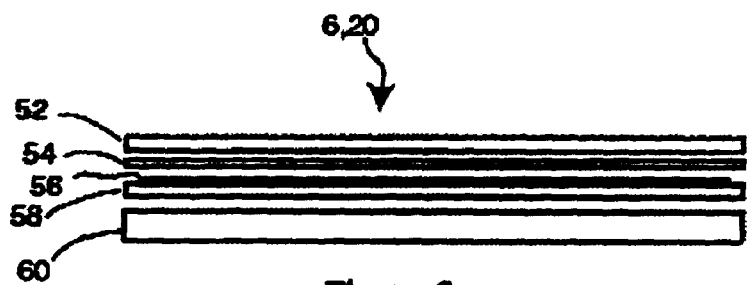
FIG. 2 shows a cross sectional view of the embodiment of the proximity and one-dimensional sensor transducer shown in FIG. 1.

FIG. 2 is a cross sectional view of the preferred embodiment of the capacitive sensor 6 (and also one-dimensional capacitive sensor 20 described below). A top transparent and electrically insulating substrate 52 is adhered with an optically transparent and electrically insulating adhesive 54 to another transparent, electrically insulating substrate 58 that is coated with a transparent conductor 56. Typically, the substantially transparent conductor 56 is deposited onto the substrate 58 either by a sputtering process or by a printing method. The pattern of the transparent conductor trace 56 can be done by a photoresist and acid-etch process. Alternatively, conductor 56 may be selectively coated, either by sputtering or printing, onto a negative pattern overlaying the substrate 58. Then, removing the negative pattern leaves the appropriate transparent conductor trace pattern. Because sensor 6 only detects contact and proximity, only one sensor trace and one conductor layer is needed.

Examples of transparent, electrically insulating substrates 52 and 58 include, but are in no way limited to, polyester film, glass, and polycarbonate plastic. One example of a transparent, electrically insulating adhesive is 3M #8142. Examples of substantially transparent conductors include, but are not limited to, Indium Tin Oxide (ITO), transparent conductive plastic, and silver, gold, aluminum alloys. Those skilled in the art will recognize that no material is completely transparent. To improve transparency of the sensor a number of techniques can be utilized. First, substrates 52 and 58 and adhesive 54 can be chosen to have similar indices of refraction. This improves transparency by minimizing the distorting effects of light traveling through materials of different refraction indices. Second, employing the sensing art described U.S. Pat. No. 5,880,411 allows the use of high impedance output drivers. Hence, the resistivity of transparent conductor layer 56 can be relatively high and still be usable with such a sensing system. A high resistivity such as, but not limited to, 300 Ω/square increases transparency of the substantially transparent conductor layer 56.

Layer 60 shows the location of a substrate that would be viewable through transparent layers 52–58. Examples of such a substrate include, but are not limited to, an opaque substrate, or a graphical display device such as, but not limited to a Liquid Crystal Display (LCD) or Cathode Ray Tube (CRT), artwork, or additional electronics such a fingerprint recognizer. In some embodiments, layer 60 may be omitted altogether. Alternatively, substrate 58 can be omitted and transparent conductor 56 can be patterned directly on layer 60.

In yet other alternative embodiments, layers 52–58 can be reversed without loss of functionality. Furthermore, adhesive 54 can be eliminated so long as substrate 52 is electrically insulating and self-adhering to conductor 56. One example of a self-adhering, transparent, electrically insulating substrate is transparent-coat paint.

Figure 3:
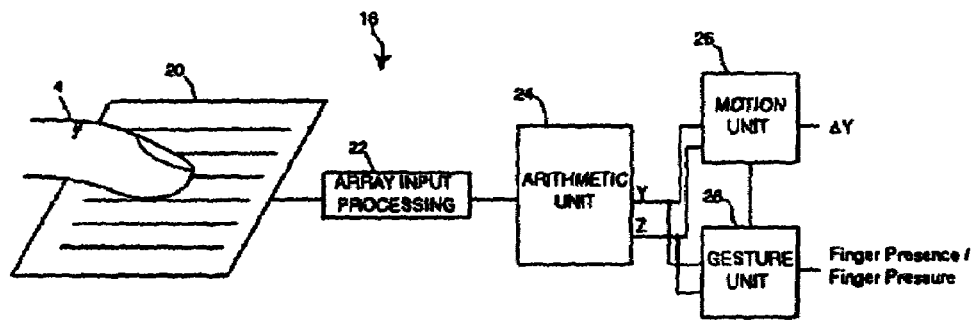
FIG. 3 shows a schematic representation of a one-dimensional transparent capacitive sensing system of the present invention.

FIG. 3 shows a schematic representation of a one-dimensional position sensing system 16. Such a system can detect not just finger contact (like proximity sensing system 2), but also the location of a finger 4 or other conductive object along the direction of the sensor trace array. In FIG. 3, sensor 20 contains a plurality of traces oriented along one direction, such as the Y axis, allowing sensing system 16 to determine the position of finger 4 along that direction. Finger location is computed by measuring the capacitance of the traces and then computing finger position based on the increase in capacitance in traces covered or near the finger. Specifically, Y input processing block 22 measures trace capacitance simultaneously in all sensor traces, and digitizes the analog capacitance values. These values are then converted to position and pressure information in arithmetic block 24. Next, position and pressure data are fed into a motion block 26 and gesture block 28. Motion block 26 computes finger motion along the trace array axis based on storing a successive history of finger position values. Gesture block 28 determines if a finger is actually in contact with sensor 20 and whether the finger presence over a short period of time is considered a "tap". If a tap gesture is registered, the gesture unit suppresses the output of the motion unit. Blocks 22–28 also incorporate methods to suppress electrical noise that may be sensed by sensor 20. Suitable algorithms and means for implementing this sensor include the technologies described in U.S. Pat. Nos. 5,880,411 and 5,305,017, incorporated in their entirety by reference thereto as described above. Those skilled in the art will recognize that such algorithms are only illustrative and in no way limiting of the capacitive sensing technology that is possible with this sensor.

The one-dimensional sensor 20 is comprised of a plurality of sensor traces equally spaced along a given axis. To achieve adequate positional resolution, spacing of each sensor trace is typically designed so that a finger 4 covers at least two traces at any given location in the sensing area to allow interpolation between the traces. A higher trace density or higher precision A/D converters improves the resolution to which sensing system 16 can compute finger position. To maximize capacitive coupling between a trace and a finger, a trace is typically made as wide as possible (for example, slightly less than a trace spacing) without touching neighboring traces. As described above with respect to the proximity sensing system 2, non-visible portions of the sensor can optionally be drawn with an opaque conductor.

A cross-sectional view of one-dimensional position sensor 20 is shown in FIG. 2, previously described. In the preferred, but not limiting embodiment, the substrate 58 is uniformly coated with the transparent conductor and then the trace array is patterned using a photoresist and acid-etch process. Alternatively, a negative photoresist pattern can be screened on transparent substrate 62 and 68, the transparent conductor deposited using a sputtering or screening process and then the photoresist pattern removed. As discussed above with respect to the proximity sensing system 2, the stack-up of one-dimensional position sensor 20 comprising layers 52–60 can be reversed and a self-adhering, insulative substrate 52 can obviate the need for adhesive 54.

Figure 4:
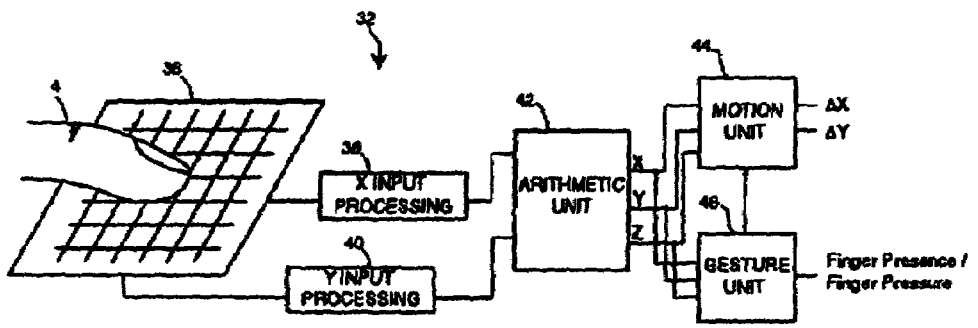
FIG. 4 shows a schematic representation of a two-dimensional transparent capacitive sensing system of the present invention.

FIG. 4 is a schematic representation of a two-dimensional position sensing system 32. Such a system can determine finger presence as finger position along two direction axes. Finger 4 capacitively couples to sensor traces in sensor 36. X input processing block 38 and Y input processing block 40 measure capacitance values of sensor traces in the X and Y trace arrays and digitize the capacitance values. Arithmetic unit 42 computes position and pressure coordinates based on the digitized capacitance values. Next position and pressure coordinates are fed into motion unit 44 and gesture unit 46. Motion unit 44 computes relative movement of the finger compared to the previous position of the finger. Gesture unit 46 determines the finger presence over time and whether it constitutes a gesture such as a tap. If gesture unit 46 recognizes a particular gesture, it will suppress the output of the motion unit 44. Blocks 38–46 also incorporate methods to suppress electrical noise that may be sensed by sensor 36. Suitable algorithms and means for implementing this sensor include the technologies described in U.S. Pat. Nos. 5,880, 411 and 5,305,017, incorporated in their entirety by reference thereto as described above. Those skilled in the art will recognize that such algorithms are only illustrative and in no way limiting of the capacitive sensing technology that is possible with this sensor.

FIG. 5A shows the preferred embodiment for the array of sensor traces used to compute position in the X-axis in sensor 36. Each trace 64 is a transparent conductor, equally spaced on a transparent, electrically insulating substrate 62. Each diamond 66 increases the trace area and also leaves a pattern of diamond-shaped regions containing no conductive material. FIG. 5B is the corresponding preferred embodiment for the array of sensor traces used to compute position in the Y-axis for sensor 36. Each trace 70 is also a transparent conductor, equally spaced on transparent, electrically insulating substrate 68. Diamonds such as diamond 72 increase trace area and leave a diamond-shaped region where there is no conductive material.

The actual number of sensor arrays and the presence of two axes of sensors will depend on the positioning area and resolution requirements of a particular device. To achieve adequate positional resolution, spacing of each sensor trace is typically designed so that a finger 4 covers at least two traces in each axis at any given location in the sensing area. A higher trace density or more precise A/D converters improves the resolution that sensing system 32 can compute finger position. In some embodiments of the art, fewer X and Y traces will suffice to achieve the desired sensing resolution. Non-visible portions of the sensor can optionally be drawn with an opaque conductor such as, but not limited to, silver ink.

In the preferred, but not limiting embodiment, substrates 62 and 68 are uniformly coated with the transparent conductor and then patterned using a photoresist and acid-etch process. Alternately, a negative photoresist pattern can be screened on transparent substrate 62 and 68, the transparent conductor deposited using a sputtering or screening process and then the photoresist pattern removed.

FIG. 5C is a top view of sensor 36 with Y-axis traces from substrate 68 on top and X-axis traces from substrate 62 on the bottom. X-traces 66 are positioned so that their trace diamonds 72 fill diamond spaces between the Y axis traces 70. For illustrative purposes, Y-axis trace diamonds 72 are reduced in size to visually distinguish the diamonds in the two different arrays. In the preferred embodiment, these diamonds are enlarged to the size of the spaces between X traces 66 so that sensor 36 appears to have a single uniform layer of transparent conductive material (except for the small regions where an X trace 64 overlaps a Y trace 70). Filling the entire active area with at least one layer of transparent conductor is desirable, but not limiting for the overall transparency of sensor 36 since transparent conductive material such as (but not limited to) Indium Tin Oxide (ITO), gold, and silver are not perfectly transparent. Any region not covered with at least one layer of conductor in sensor 36 may be seen because it will have greater transmissivity compared to a region covered with a conductor.

Figure 5D:
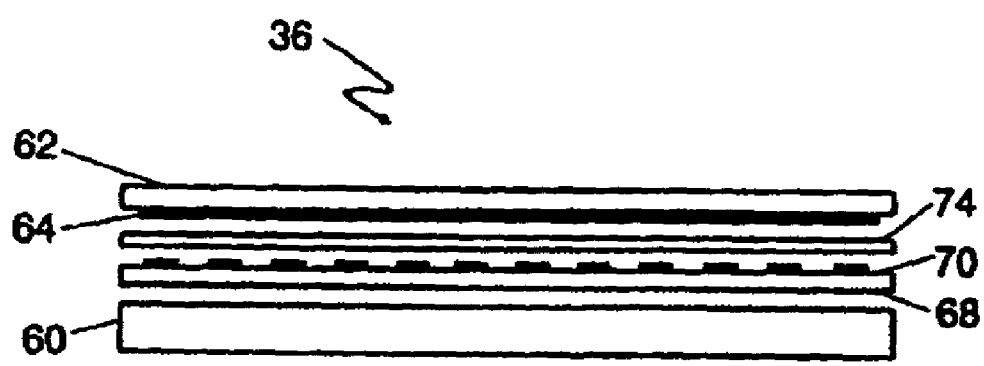
FIG. 5D is a cross-sectional view of a two dimensional sensor.

FIG. 5D shows a cross sectional view of the preferred embodiment of two-dimensional sensor 36. This stack-up can be reversed in order without loss of functionality. X-axis transparent, electrically insulating substrate 62 is the top surface that the finger or conductive object touches. The bottom side of the transparent, electrically insulating substrate 62 is the transparent conductor traces 64. A thin, transparent, preferably adhesive, insulator 74 separates X conductive traces 64 from Y conductive traces 70. Similar to X traces, Y conductive traces are coated on transparent, electrically insulating substrate 68.

Examples of transparent substrates 62 and 68, insulator 74, and conductive layers 64 and 70 have been described for FIG. 2 and are equally applicable for the two-dimensional sensor. Similarly, the same techniques to improve transparency such as, but not limited to, matching indices of refraction among layers, and using a relatively thin layer of transparent conductor, can also be applied to the two-dimensional sensor. Similar to FIG. 2, layer 60 is an optional opaque layer that can be viewed through the transparent sensor. In some embodiments, layer 60 may be omitted altogether. Alternatively, in some embodiments, substrate 68 can be omitted and transparent conductor 70 can be patterned directly on layer 60.

Figure 6:
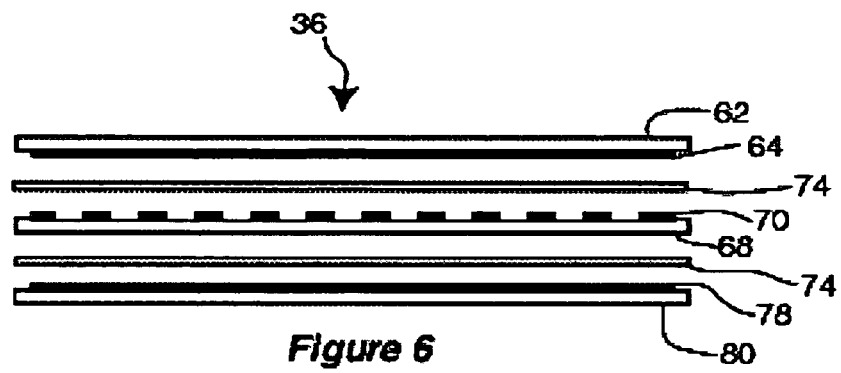
FIG. 6 is a cross sectional view of a two-dimensional sensor transducer embodiment of the invention with a transparent ground plane to shield X and Y trace arrays from electrical noise that might arise beneath the sensor.

A number of additional alternative embodiments of the invention are possible. For example, electrical shielding may be required to isolate sensor traces from electrical noise that arises from electrical circuits that are present below the sensor. One preferred, but not limiting embodiment is shown in FIG. 6 on two-dimensional sensor 36. Layers 62–68 are the same art as described in FIG. 5D. Beneath transparent substrate 68, another layer of transparent insulator 74 attaches another layer of transparent conductor 78 and substrate 80. Unlike transparent conductor layers 64 and 70, transparent conductor 78 is a uniform layer of conductor that is connected to an electrical ground. Grounding transparent conductor 78 provides sensor 36 with electrical shielding from electrical noise sources that might radiate from layer 60 or below. Examples of materials suitable for transparent conductor 78 and substrate 80 have already been described in FIG. 2.

Adding a transparent ground plane using layers 74–80 can also be applied to the contact and one-dimensional sensor stack-ups shown in FIG. 2 if such a layer were inserted between layers 58 and 60.

Figure 7:
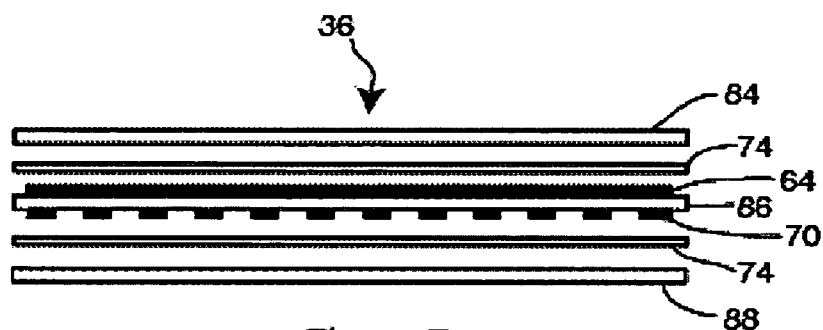
FIG. 7 is a cross sectional view of an alternate embodiment of the two-dimensional sensor transducer of the invention.

In yet another embodiment, FIG. 7 shows a two-dimensional transparent capacitive sensor 36. Transparent substrate 84 is adhered using transparent insulator 74 to transparent conductor layer 64. Transparent conductor 64 contains the X trace pattern as shown in FIG. 5A and is coated onto transparent substrate 86. On the other surface of transparent substrate 86, transparent conductor layer 70 contains Y trace array shown FIG. 5B. Finally, transparent substrate 88 is adhered to transparent conductor 70 with transparent insulator 74. This particular embodiment, with substrate 86 coated on both sides with transparent conductor layers may allow for less error when aligning diamonds in the X trace array and the Y trace array. Because substrate 86 contains both conductor layers 64 and 70, the alignment of trace arrays can occur prior to the etching/deposition of the trace arrays with the opaque photoresist pattern, greatly simplifying pattern alignment of X and Y traces. Proper alignment of the X and Y trace arrays is critical to the overall transparency of two-dimensional sensor 36 because the human eye can easily detect any systematic misalignment between the trace array patterns.

Examples of transparent, electrically insulating substrates 84, 86, and 88 have been described in previous embodiments of two-dimensional sensor 36 and one-dimensional sensor 20. Additionally, for electrical shielding, transparent substrate 88 can be replaced with layers 78 and 80 as shown in FIG. 6.

This invention may also be adapted for use with a stylus in addition to the human finger. One method for doing so is to enlarge the contact area for a conductive stylus until its contact area is similar to that of a finger. This has the obvious disadvantage of the stylus needing to be both conductive and the contact area needing to be large enough to capacitively couple to enough sensor traces. To reduce the contact area of the conductive input, one method is to increase the trace density so that even a fine, pointed conductive stylus can capacitively couple to at least two sensor traces. Alternatively, A/D converter precision can also be increased to detect minute capacitance changes in sensor traces that result from a pointed stylus.

Figure 8:
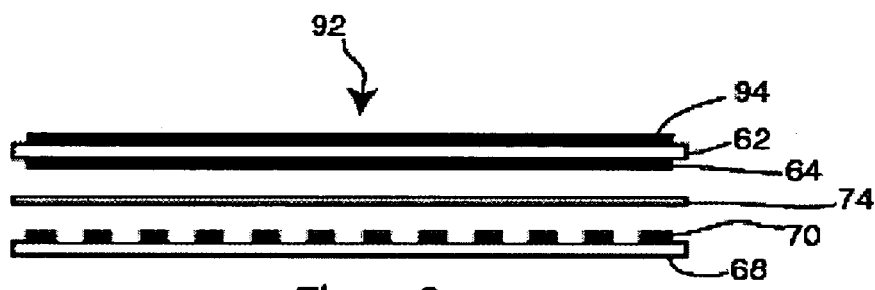
FIG. 8 is a cross sectional view of a two-dimensional transparent sensor transducer embodiment of the invention that allows use of a conductive stylus in additional to finger for input.

One preferred alternative method that removes the restriction of a large contact area involves a resistive transparent coating applied to the top surface of the sensor array, resulting in the stack-up of layers shown in FIG. 8. For two-dimensional position sensor 92, the X and Y trace arrays are identical to that described in FIGS. 5A, 5B, and 5C. The stack-up of layers 62–68 is identical to that described in FIG. 5D. Layer 94 is a rugged, resistive transparent coating that spreads the effective contact area of a pointed stylus, thus allowing a pointed stylus's capacitive coupling to the sensor 92 to be similar to a conductive object with a larger contact area (such as a finger). Examples of such a layer 94 can be found, but are not limited to, those commonly used for electro-luminescent lighting surfaces. Further details of such a sensing technology can be found in co-pending U.S. patent application Ser. No. 09/176,639.

Figure 9:
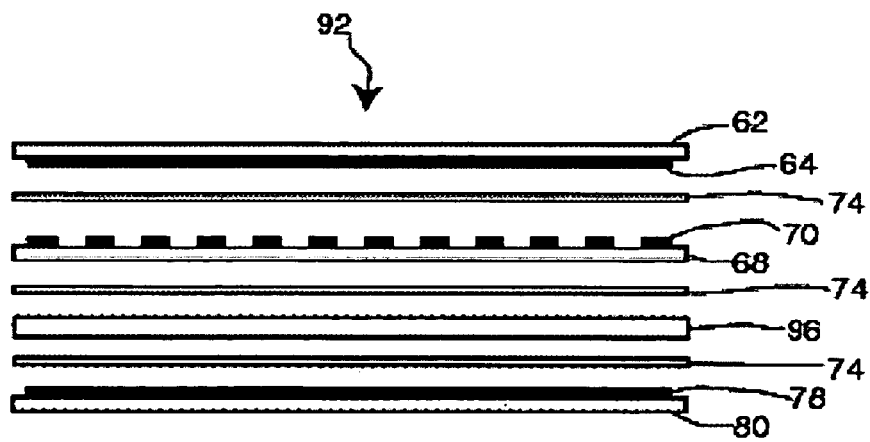
FIG. 9 is a cross sectional view of a two-dimensional sensor transparent transducer embodiment of the invention that allows use of any general stylus in addition to finger for input.

An approach for a two dimensional sensor that accepts any stylus input is to include a transparent, deformable layer sandwiched between the bottom sensor array layer and a ground plane. FIG. 9 illustrates the stack up of a preferred but not limiting embodiment of such a sensor 92. Layers 62–68 are the same as those described for a finger input two-dimensional sensor 36 as described in FIGS. 5A–D. The only additional requirement for this art is that substrates 62 and 68 be flexible and deformable. An example of such a substrate is, but is not limited to, polyester film.

Beneath transparent substrate 68 is transparent insulator 74. This adheres to a transparent, deformable dielectric layer 96. Another layer of transparent insulator 74 adheres deformable layer 96 to a transparent, conductive layer 78 and transparent substrate 80. Transparent substrate 80 is typically made of a rigid material. Examples of such a transparent rigid substrate include, but are not limited to, glass and polycarbonate plastic. Transparent conductive layer 78 is a uniform layer of transparent conductor that is electrically grounded.

Functionally, a pointed stylus input will deform the X and Y sensors in layers 62–68 as well as layer 96, bringing the point of contact closer to the ground plane. This deformation increases the capacitive coupling to ground for sensor traces near the point of contact. This capacitance increase is then detected by the sensing electronics. For finger input, capacitance is sensed by sensor layers 62–68 using traditional capacitive means. A detailed description of this art, though not in a transparent embodiment, can be found in U.S. Pat. No. 5,942,733, which is hereby incorporated in its entirety by reference thereto.

Yet another alternative method is to combine the transparent capacitive finger sensor of the present invention with a second independent stylus input device. For example, a flexible transparent capacitive pad could be overlayed on a conventional resistive pad to provide superior finger sensitivity to that achievable with a resistive pad alone. Or, a transparent capacitive pad could be overlayed on a solid state sensor such as an inductive stylus sensor (e.g., U.S. Pat. No. 4,848,496 to Murakami, hereby incorporated by reference thereto for this teaching) to produce a rugged sensor with high quality finger and stylus performance.

The transparent position sensing system has a number of applications for portable electronic devices. Some examples (but not an exhaustive list) of applications include:

a) Pointing device for a touchscreen in a handheld electronic device. In the simplest implementation, a transparent two-dimensional capacitive sensor is affixed directly on top of a display device like an LCD screen to detect a finger's location on the display. The X-Y position of a finger atop the sensor (and thus, the display) can then be fed to the device's main processing unit to control the user interface in the device. Such a user interface could include, but is not limited to, the control of a cursor on the screen, detection of taps for on-screen graphics that represent buttons, control of on-screen scroll bars, pull-down menu selection, and stroke or gesture recognition for text-entry.

b) Input device for a soft button array or scroll bar. In this application, the transparent sensor covers only the portion of the display device that is dedicated to displaying an array of buttons or a scroll bar. For a scroll bar application or a one-dimensional button array, the transparent sensor would only contain a plurality of sensor traces in one axis. By implementing the input device with a transparent sensor, the underlying graphics can change to suit the functionality required by the user interface c) Integration of input devices in a handheld electronic device. For some handheld devices, one surface of the device may contain a display that requires a touch sensitive positioning system while another surface may require a button array. Because this art can be made from transparent, flexible material, the same capacitive sensor could be curved over the handheld device so that one portion of the sensor's trace arrays covers the display surface while another portion of the sensor serves as the button array on another surface. This could reduce the cost of the handheld device by eliminating the need for additional mechanical contact switches.

d) Transparent sensor for portable computer. The transparent nature of the transparent two-dimensional position sensor allows the addition of apparatus for applications such as, but not limited to security and video to be designed into portable personal computers without consuming more real estate than a standard, opaque two-dimensional position sensor. In the case of security applications, the pointing nature of the touchpad is a logical location to embed a fingerprint-based security system. Other biometric security systems such as a retinal scanner can also be placed underneath the transparent touchpad. The electronic sensor for the biometric system can be located underneath the sensor array (i.e. layer 60 in FIGS. 2 and 5D) and will be minimally affected by the transparent sensor. Also, the transparent nature of the touchpad is also a reasonable location for a video camera since the touchpad surface protects the camera from the environment e) Graphic underlays beneath the transparent capacitive sensor (other than a display device). In some applications, the use of a display device such as an LCD screen may not be necessary or cost-effective. In such applications, a simple graphic underlay such as a plastic button template could be slid into a slot underneath the transparent sensor. Advertising logos or other graphics not related to the device user interface could also be placed under the sensor.

f) Display-enhanced capacitive sensor for a personal computer. To enhance the user interface for personal computers, the transparent two-dimensional sensor can be used in conjunction with an underlying LCD display device for a display-enhanced sensor input device. The underlying LCD screen can provide information such as a record of the current stroke or gesture for handwriting recognition, signature/text capture or graphics software. Soft buttons, icons, scroll bars, or other zones of enhanced sensor functionality could also brought to attention on the LCD screen. In more general terms, a display-enhanced sensor could contain specific applications that interface with the host computer. Examples include, but are not limited to, mimicking a numeric keypad, launching applications, or providing menus or soft buttons that are specific to a software application that is running concurrently on the host computer. Finally, advertising logos, or bitmapped images and photographs can be drawn in the LCD screen to enhance functionality or as additional display space.

g) Display-enhanced capacitive sensor for personal computer that detaches to function as a stand alone handheld device. A further extension of the display-enhanced sensor is a detachable transparent sensor and LCD display assembly. While the sensor and LCD is attached to the host computer, it functions as a display-enhanced sensor as described in the previous section. However, the sensor and LCD assembly also contains hardware and software to function as a stand alone, handheld device, for example, a personal digital assistant (PDA) device such as a 3Com PalmPilot™ or a Rolodex Rex™. The detachable sensor has distinct benefits. First, it serves as a simple security mechanism for the host computer since most modern computer operating systems are almost impossible to use without a pointing device. Second, the detachable capacitive sensor provides an obvious location to store the PDA without need for a separate cradle or docking station. Because the input is a capacitive position sensor, the finger pointing performance of such a device is the same as the current state-of-the-art computer touchpads and vastly superior to the resistive pads that are currently in use on most PDA devices.

h) Transparent capacitive sensor as an aesthetic improvement to personal computer design. In some modern computers, transparency is used for purely aesthetic or artistic purposes. A transparent sensor array allows industrial designers to incorporate a pointing device onto a computer but allow the surface underneath to be viewable. This might allow the underlying electronics of the computer, or other artwork such as, but no limited to, logos, advertising, or labels, to be viewable.

Described herein is a preferred embodiment, however, one skilled in the art that pertains to the present invention will understand that there are equivalent alternative embodiments.

What is claimed is:

1. A transparent capacitive touch sensing system comprising:
    a substrate;
    a sensory array disposed on the substrate and comprising a plurality of substantially transparent conductive traces disposed along a first axis, the sensory array covering a portion of the substrate, wherein the sensory array is configured to sense capacitively the input object along a second axis;
    a substantially transparent and electrically conductive ground plane configured to shield electrically a bottom of said sensory array opposite the input object; and
    a sensing device for detecting capacitance changes on said sensory array.

2. The system of claim 1, further including a position detector for determining a position of said input object near said sensory array.

3. The system of claim 1, further including a system that recognizes tap gestures.

4. The system of claim 1, wherein said substrate is a flexible, transparent substrate.

5. The system of claim 1, wherein said substrate is a rigid, transparent substrate.

6. The system of claim 1, wherein said sensory array is atop a display device.

7. The system of claim 6, wherein said display device is a liquid crystal display.

8. The system of claim 1, wherein said sensory array is atop a fingerprint sensor.

9. The system of claim 1, wherein said sensory array is atop a passive graphic underlay.

10. A transparent capacitive touch sensing system comprising:
    a substantially transparent two-dimensional sensory array consisting of a plurality of substantially transparent conductive traces in an X axis and a plurality of substantially transparent conductive traces in a Y axis for sensing capacitive coupling between an input object and said sensory array along two axes, wherein a bottom of said sensory array opposite the input object is electrically shielded using a substantially transparent and electrically conductive ground plane;
    a substantially transparent electrically insulating material separating said plurality of X traces from said plurality of Y traces; and
    a sensing device for detecting capacitance changes on said sensory array.

11. A transparent capacitive touch sensing system comprising:
    a substantially transparent two-dimensional sensory array consisting of a plurality of substantially transparent conductive traces in an X axis and a plurality of substantially transparent conductive traces in a Y axis for sensing capacitive coupling between an input object and said sensory array along two axes, wherein said conductive traces in the X axis and the Y axis are spaced such that conductive traces in the X axis substantially fill spaces between conductive traces in the Y axis to thereby form a substantially space-filling pattern across said sensory array;
    a substantially transparent electrically insulating material separating said plurality of X traces from said plurality of Y traces; and
    a sensing device for detecting capacitance changes on said sensory array.

12. The system of claim 11, wherein said sensory array comprises a plurality of layers having approximately the same index of refraction.

13. The system of claim 11, wherein said sensory array is atop a display device.

14. The system of claim 13, wherein said sensory array is directly disposed on the display device.

15. The system of claim 13, wherein said display device is a liquid crystal display.

16. The system of claim 11, wherein said sensory array is beneath a clear protective covering for a display device.

17. The system of claim 11 further comprising a substantially transparent adhesive disposed to fill gaps between the substantially transparent conductive traces.

18. The system of claim 11, wherein said sensory array is atop a fingerprint sensor.

19. The system of claim 11, wherein said sensory array is atop a passive graphic underlay.

20. A substantially transparent capacitive sensor comprising:
    an active area configured to accept input from a conducive object, said active area including a plurality of substantially transparent conductive traces disposed in an X axis and a plurality of substantially transparent conductive traces disposed in a Y axis; and
    a substantially transparent adhesive interposed between said conductive traces;
    wherein said capacitive sensor has substantially uniform transmissivity within said active area.

21. The substantially transparent capacitive sensor of claim 20, wherein said plurality of substantially transparent conductive traces disposed in said X axis and said plurality of substantially transparent conductive traces disposed in said Y axis together substantially occupy said active area.

22. The substantially transparent capacitive sensor of claim 20, wherein said plurality of substantially transparent conductive traces disposed in said X axis and said plurality of substantially transparent conductive traces disposed in said Y axis are aligned to maximize transparency.

23. The substantially transparent capacitive sensor of claim 20 wherein the substantially transparent adhesive has an index of refraction similar to an index of refraction of said conductive traces.

24. The substantially transparent capacitive sensor of claim 20 wherein said conductive traces in the X axis and in the Y axis are spaced such that conductive traces in the X axis substantially fill spaces between conductive traces in the Y axis and vice versa to thereby form a substantially space-filling pattern across said sensory array.

25. The substantially transparent capacitive sensor of claim 20 wherein the substantially transparent adhesive has an index of refraction similar to an index of refraction of the conductive traces.

26. The capacitive sensor of claim 20, wherein the active area is atop a display device.

27. The system of claim 26, wherein said active area is directly disposed on the display device.

28. The system of claim 26, wherein said display device is a liquid crystal display.

29. A transparent capacitive touch sensor formed on a substrate for accepting an input from a conductive object, the system comprising:

a sensory array of substantially transparent conductive traces formed from a material having an index of refraction, the array comprising a first plurality of conductive traces disposed on said substrate in an first direction and a second plurality of conductive traces disposed on said substrate in a second direction different from said first direction, wherein the first and second pluralities of conductive traces are formed such that conductive traces in the first direction substantially fill spaces between conductive traces in the second direction and vice versa to thereby form a substantially space-filling pattern across said sensory array;

a substantially transparent adhesive interposed between said conductive traces and having an index of refraction similar to the index of refraction of the conductive traces to thereby provide a substantially uniform transmissivity across said sensory array; and a sensing device electrically coupled to each of the conductive traces to thereby detect capacitance changes on said sensory array.

30. A substantially transparent capacitive sensor comprising:

an active area configured to accept input from a conductive object, said active area including a plurality of substantially transparent conductive traces disposed in an X axis and a plurality of substantially transparent conductive traces disposed in a Y axis, wherein said conductive traces in the X axis and in the Y axis are spaced such that conductive traces in the X axis substantially fill spaces between conductive traces in the Y axis and vice versa to thereby form a substantially space-filling pattern across said sensory array; and wherein said capacitive sensor has substantially uniform transmissivity within said active area.

* * * * *

UNITED STATES PATENT AND TRADEMARK OFFICE
CERTIFICATE OF CORRECTION

PATENT NO. : 7,030,860 B1
APPLICATION NO. : 09/415481
DATED : April 18, 2006
INVENTOR(S) : Hsu et al.

Page 1 of 1

It is certified that error appears in the above-identified patent and that said Letters Patent is hereby corrected as shown below:

Claim 29, column 13, line 19, delete "in an" and replace with --in a --.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,030,860 B1 |
| APPLICATION NO. | : 09/415481 |
| DATED | : April 18, 2006 |
| INVENTOR(S) | : Hsu et al. |

It is certified that error appears in the above-identified patent and that said Letters Patent is hereby corrected as shown below:

In Claim 1, column 11, line 29, delete "the input" and replace with --an input--.

Signed and Sealed this

Twenty-seventh Day of May, 2008

JON W. DUDAS
*Director of the United States Patent and Trademark Office*